July 13, 1965   R. G. LE TOURNEAU   3,194,414
STABILIZER APPARATUS
Filed Nov. 26, 1963

INVENTOR.
Robert G. LeTourneau
BY Wm. T. Wofford
Attorney

United States Patent Office 3,194,414
Patented July 13, 1965

3,194,414
STABILIZER APPARATUS
Robert G. LeTourneau, P.O. Box 2307, Longview, Tex.
Filed Nov. 26, 1963, Ser. No. 325,971
6 Claims. (Cl. 212—145)

My invention relates generally to stabilizer apparatus and more particularly to laterally extendable stabilizer devices for use on crane vehicles and like equipment.

The general object of the present invention is to provide improved laterally extendable vehicular stabilizer apparatus.

Figure 1:
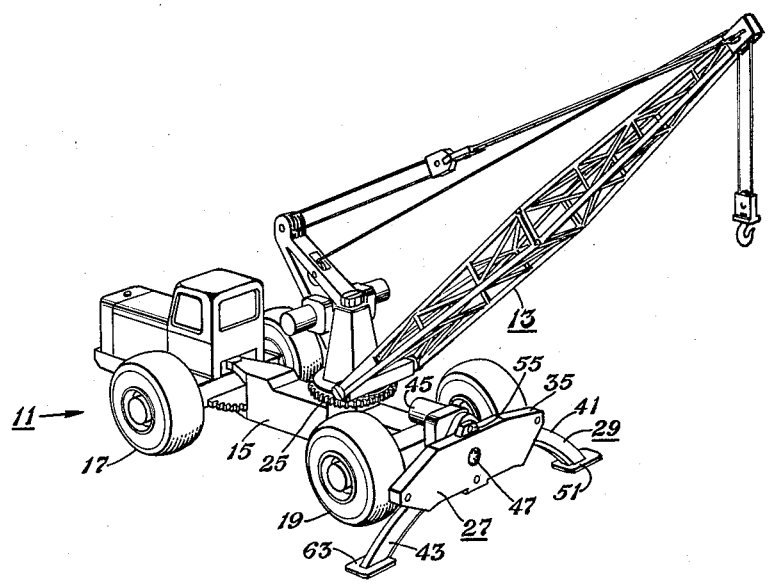
Figure 2:
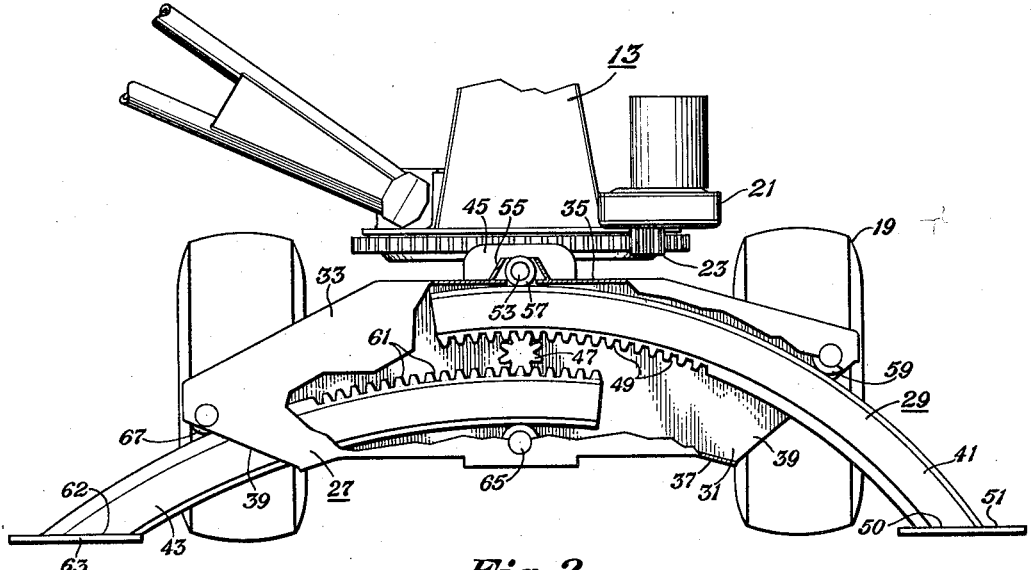

This and other objects are effected by my invention as will be apparaent from the following description taken in accordance with the accompanying drawing, forming a part of this application, in which:

FIG. 1 is a schematic perspective view of a laterally extendable vehicular stabilizer apparatus in accordance with a preferred embodiment of the present invention; and FIG. 2 is a schematic elevational view of the laterally extendable stabilizer device of FIG. 1 with a covering portion thereof broken away to more clearly show the internal structure.

Referring to the drawing, FIG. 1 illustrates a self-propelled vehicle 11 on which is mounted a rotatable crane 13. The vehicle 11 includes an articulated main frame 15 which is supported adjacent its front and rear ends by wheel and axle arrangements 17, 19 respectively. The crane 13 is mounted on the main frame 15 as shown in FIG. 1, and is rotatable by an electric motor driven gear reduction 21 having an output pinion 23 which engages a ring gear 25 fixed to the main frame 15; the gear reduction being mounted on the rotatable superstructure portion of the crane 13.

The main frame 15 extends rearwardly of the rear wheel and axle arrangement 19 a short distance and there is fixed to the frame extension a transversely extending hollow plate structure 27 in which is disposed a laterally extendable stabilizer apparatus 29. The hollow plate structure 27 includes vertical spaced apart parallel front and rear plate members 31, 33 respectively, which are preferably shaped about as shown in FIG. 2. A top plate 35 is disposed between the front and rear plate members 31, 33 adjacent the top edges thereof and is suitably fixed thereto, as by welding or in any other appropriate manner. A bottom plate 37 is similarly disposed and attached to the bottom edges of the plates 31, 35, but it is not as extensive as the top plate 35. Therefore, there is, at opposite ends of the structure 27, an opening 39 or aperture through which the stabilizer apparatus 29 projects and in which it may reciprocate.

The stabilizer apparatus 29 comprises basically first and second stabilizer arms 41, 43 respectively, and an electric motor driven gear reduction 45, having an output pinion 47. The first stabilizer arm 41 is a heavy beam structure which is formed preferably to a circular arc. The inner arcuate edge surface of the arm 41 is provided with a plurality of rack teeth 49 which extend, from one end of the arm toward the other end, a distance equal to about one-half the length of the arm. The other end of the arm 41 has a ground engaging plate member or support foot 51 fixed thereto, as at 50, by welding or in any other appropriate manner. The gear reduction 45 is suitably mounted and fixed to the front side of the plate 31 in such a manner that the pinion 47, which projects through the plate 31, is disposed to rotate within the hollow structure 27. The pinion 47 is located preferably in the central vertical plane of the vehicle 11. In FIG. 2 it will be noticed that the first arcuate stabilizer arm 41 is located and disposed within the hollow structure so that the rack teeth coact with the pinion 47 and the ground engaging plate 51 is disposed outside of the hollow structure 27. The first stabilizer arm 41 is disposed to move above the pinion 47, with the center of curvature of the arcuate arm being located preferably below the pinion and in the central vertical plane through the pinion. A first guide roller 53 is journaled in an upwardly extending plate structure 55, fixed to the top plate 35, and the roller is so mounted therein that the lower periphery of it projects through an aperture 57 in the top plate 35 and engages the upper arcuate surface of the stabilizer arm 41. A second guide roller 59 is journaled in the hollow structure 27, adjacent the aperture 39 on the right side thereof (as viewed in FIG. 2), and is so located and disposed that it also engages the upper arcuate surface of the stabilizer arm 41.

The second stabilizer arm 43 is likewise a heavy arcuate beam which is formed to a circular arc centered in the central vertical plane. It should be pointed out, however, that, for a reason which will be explained later, the radius of curvature of the first stabilizer arm 41 is smaller than the radius of curvature of the second stabilizer arm 43. The outer edge surface of the arcuate arm 43 is provided with a plurality of rack teeth 61 which, like the rack teeth 49, extend, from one end of the arm, about one-half the length of the arm toward the other end. The other end of the arm 43 has fixed to it, as at 62, similar ground engaging plate or support foot member 63. The second stabilizer arm 43 likewise is so disposed within the structure 27 that the rack teeth 61 engage the pinion 47. However, the second stabilizer arm 43 moves in an arcuate path beneath the pinion 47 as it rotates, and the arcuate movement of the arm 43, as will be evident from FIG. 2, is opposite in direction from the movement of the first stabilizer arm 41. A third guide roller 65 is suitably journaled within the hollow structure 27 and is located preferably in vertical alignment with both the first guide roller 53 and the pinion 47. However, the rollers 53, 65 need not necessarily be aligned vertically with respect to each other, nor with respect to the pinion 47. A fourth guide roller 67 is journaled in the hollow structure 27 and is located adjacent the aperture 39 on the left side (as viewed in FIG. 2). The roller 67 is so disposed that it engages the top surface of the second stabilizer arm 43 in the same manner as the roller 59 engages the arm 41.

To understand the use of the stabilizer apparatus 29, reference may be made initially to FIG. 2. When the crane is oriented as shown for the purpose of lifting heavy loads from over the side of the vehicle 11, it is desirable and frequently necessary to extend the lateral stabilizer apparatus to prevent tipping of the vehicle. To accomplish this with the present invention, it is only necessary to actuate the gear reduction 45 to cause the pinion 47 to rotate in a clockwise direction, as viewed in FIG. 2. The first and second stabilizer arms 41, 43 being jointly coactive with the single pinion 47, will move outward simultaneously from the retracted position. The output pinion 47 may be rotated until the stabilizer arms 41, 43 reach an operative stabilizing position, which is evident when both of the ground engaging plates 51, 63 are firmly in contact with the ground, which condition is indicated generally in FIG. 2. When the vehicle has become stabilized by placing the stabilizer arms 41, 43 in their extended position, the gear reduction and pinion may be stopped and secured by means of the braking system which is built into the gear reduction 45. While this is a convenient method to hold and maintain the stabilizer arms in their operative extended position, it is evident that other suitable devices may be used to engage the arms and maintain them in any selected position. It will be noticed that the several guide rollers are located strategically so as to readily guide the stabilizer arms while moving inward and outward.

While not shown in the drawing, those skilled in the art will recognize that the stabilizer arms 41, 43 may be retracted from the extended position, as shown in FIG. 2, by merely reversing the direction of rotation of the gear motor 45 and the pinion 47. When the stabilizer arms are fully retracted, the ground engaging 51, 63 cover the aperture 39 on each side of the hollow structure, and the stabilizer arms 41, 43 are completely enclosed within the structure 27.

It should be evident also, that more than one stabilizer apparatus may, if desired, be incorporated in the vehicle shown, or in other equipment using the stabilizer apparatus of the present invention.

A feature of the present invention is that only a single pinion coacting with a pair of arcuate stabilizer arms is required to move the arms from a retracted position to an extended operative position and thence back to the retracted position.

Another feature of the present invention is that the first arcuate stabilizer arm is formed to a radius of curvature that is shorter than the radius of curvature of the second stabilizer arm. Consequently, when the stabilizer arms are extended by rotating the pinion 47, the ground engaging plates or support feet 51, 63 contact the ground at substantially the same level and the same lateral distance from the central vertical plane of the vehicle and at substantially the same time.

While I have shown my invention in only one form, it will be obvious to those skilled in the art that it is not so limited, but is susceptible of various changes and modifications without departing from the spirit thereof.

I claim:
1. In combination with a vehicle having a main frame, a vehicular stabilizer apparatus comprising:
   (a) a powered gear reduction mounted on said frame and having an output pinion disposed to rotate about an axis;
   (b) a first arcuate stabilizer arm having on one edge a plurality of rack teeth coactive with said pinion, said arm being movable laterally with respect to said frame when said pinion rotates;
   (c) a first guide roller mounted on said frame adjacent said pinion and coacting with the edge of said first stabilizer arm that is opposite said rack teeth; said first guide roller maintaining said rack teeth in coactive engagement with said pinion;
   (d) a second guide roller journally mounted to said frame and spaced apart from said first guide roller, said second guide roller being disposed to maintain contact with an arcuate edge of said first stabilizer arm as the same moves laterally in response to the rotation of said pinion;
   (e) a second arcuate stabilizer arm having on one edge a plurality of rack teeth coactive with said pinion, said arm being movably laterally with respect to said frame, when said pinion rotates, and oppositely in direction to the lateral movement of said first stabilizer arm;
   (f) a third guide roller mounted on said frame adjacent said pinion and coactive with the edge of said second stabilizer arm that is opposite the rack teeth thereon, said third guide roller maintaining said rack teeth in coactive engagement with said pinion; and
   (g) a fourth guide roller journally mounted to said frame and spaced apart from said third guide roller, said fourth guide roller being disposed to maintain contact with an arcuate edge surface of said second stabilizer arm as the same moves laterally in response to rotational movement of said pinion.

2. In combination with a vehicle having a main frame, a vehicular stabilizer apparatus comprising:
   (a) a powered gear reduction mounted on said frame and having an output pinion disposed to rotate about an axis;
   (b) a first arcuate stabilizer arm having on one edge a plurality of rack teeth coactive with said pinion, said arm being movable laterally with respect to said frame when said pinion rotates;
   (c) means on said frame engaging said first stabilizer arm and maintaining said rack teeth in coactive engagement with said pinion as said pinion rotates;
   (d) means on said frame engaging said first stabilizer arm and guiding the same when said first stabilizer arm moves laterally with respect to said frame;
   (e) a second arcuate stabilizer arm having on one edge a plurality of rack teeth coactive with said pinion, said arm being movable laterally with respect to said frame, when said pinion rotates, and oppositely in direction to the lateral movement of said first stabilizer arm;
   (f) means on said frame engaging said second stabilizer arm and maintaining said rack teeth in coactive engagement with said pinion as said pinion rotates; and
   (g) means on said frame engaging said second stabilizer arm and guiding the same when said second stabilizer arm moves laterally with respect to said frame.

3. In combination with a vehicle having a main frame, a vehicular stabilizer apparatus comprising:
   (a) first and second stabilizer arms mounted on said frame for lateral transverse movement with respect to said frame, each said arm having thereon a plurality of rack teeth and being disposed in juxtaposed spaced relation to the other said arm, and with the said rack teeth of said arms being in facing relation;
   (b) pinion means disposed between said arms and in engagement with the rack teeth of each arm; and
   (c) means for rotating said pinion to cause said stabilizer arms to move simultaneously outwardly and inwardly with respect to said frame.

4. The invention as set forth in claim 3 wherein each said stabilizer arm is arcuate in shape.

5. The invention as set forth in claim 3 wherein each stabilizer arm is arcuate in shape and the radius of curvature of one said stabilizer arm is less than the radius of curvature of the other said stabilizer arm.

6. In combination with a vehicle having a main frame, a vehicular stabilizer apparatus comprising:
   (a) a powered gear reduction mounted on said frame and having an output pinion disposed to rotate about an axis;
   (b) first and second juxtaposed stabilizer arms each having a plurality of rack teeth thereon that operatively engage said pinion, said arms being mounted on said frame for simultaneous transverse lateral extension and retraction with respect to said frame when said pinion rotates.

References Cited by the Examiner
UNITED STATES PATENTS

| | | | |
|---|---|---|---|
| 2,158,891 | 5/39 | Beacher | 180—1 |
| 2,740,538 | 4/56 | Felkner | 212—145 |
| 3,019,913 | 2/62 | Bowman | 212—145 |

SAMUEL F. COLEMAN, *Primary Examiner.*